United States Patent [19]

Christy et al.

[11] 4,113,180

[45] Sep. 12, 1978

[54] FLUSH-DRIP IRRIGATION EMITTER

[76] Inventors: Mark H. Christy, 1750 S. Zeyn St., Anaheim, Calif. 92802; Lloyd Spencer, 220 Patrician Way, Pasadena, Calif. 91105

[21] Appl. No.: 708,062

[22] Filed: Jul. 23, 1976

[51] Int. Cl.² ............................................. B05B 1/32
[52] U.S. Cl. ..................................... 239/109; 239/542
[58] Field of Search ............... 239/106, 542, 547, 109; 285/DIG. 22

[56] References Cited

U.S. PATENT DOCUMENTS

| | | | |
|---|---|---|---|
| 3,245,703 | 4/1966 | Manly | 285/DIG. 22 |
| 3,767,124 | 10/1973 | Spencer | 239/542 |
| 3,797,741 | 3/1974 | Spencer | 239/542 X |
| 3,863,845 | 2/1975 | Bumpstead | 239/542 |
| 3,927,703 | 12/1975 | Beaubien | 285/DIG. 22 X |
| 3,993,248 | 8/1975 | Harmony | 239/542 X |

*Primary Examiner*—Joseph F. Peters, Jr.
*Assistant Examiner*—Michael Mar

[57] ABSTRACT

A flush-drip irrigation emitter including a compact emitter element, a housing enclosing the emitter element and an insect guard, the emitter element having a pair of confronting oppositely arched flexible walls defining a flush flow passage with sharp lateral edges, one of the walls having at least one drip duct, the walls being responsive to a minimal pressure difference to collapse against each other in mutual sealing relation and confine flow to the drip duct.

The housing including telescopable complementary housing components provided with an inlet connectable to a water supply and an outlet, the emitter element including sealing means interposed between the housing components, the housing components having mutually engageable latch elements and a tool receiving channel to effect separation; the outlet being arranged to receive directly or indirectly through a small irrigation tube, an insect guard.

3 Claims, 12 Drawing Figures

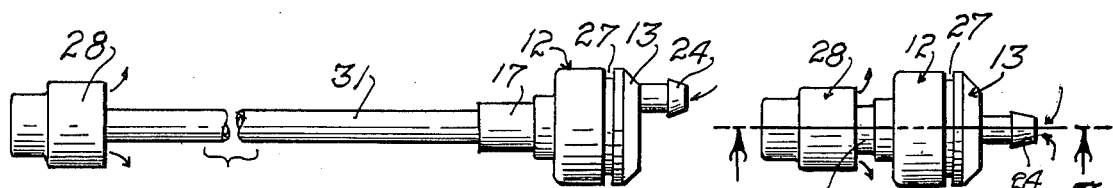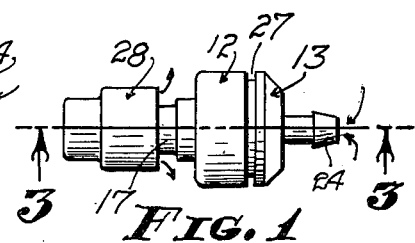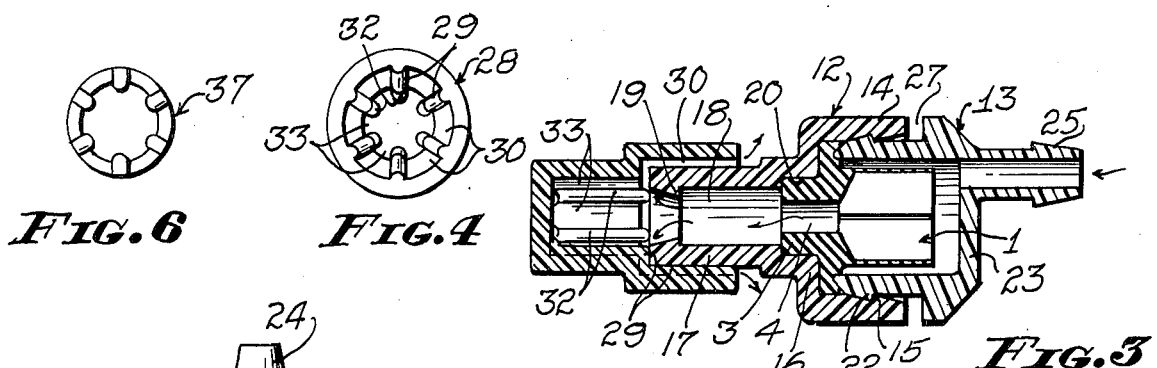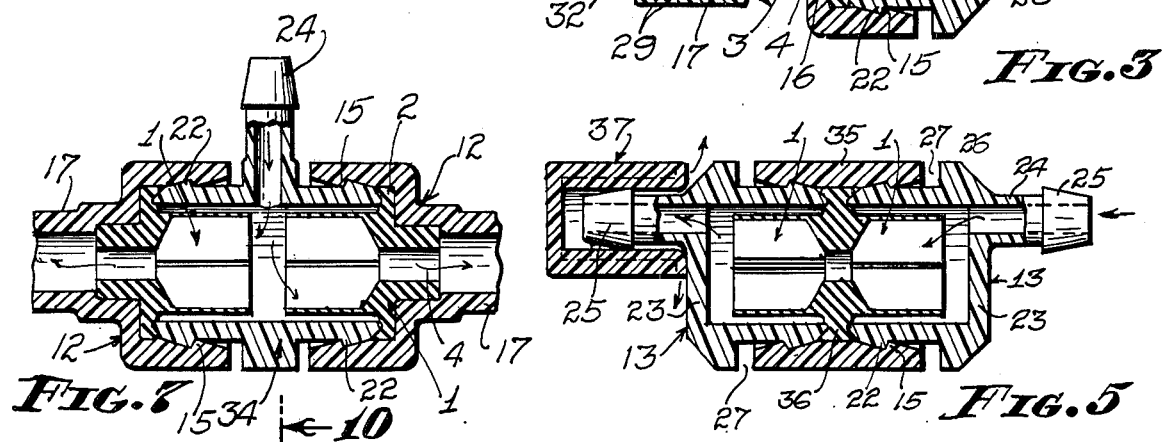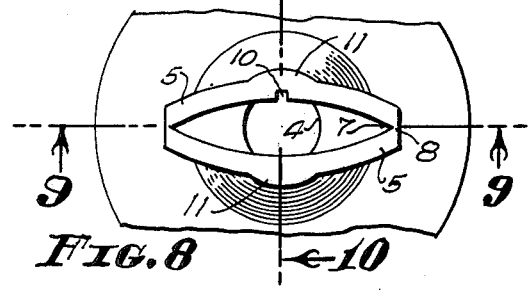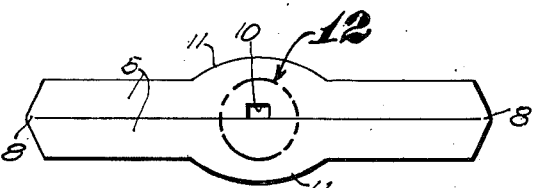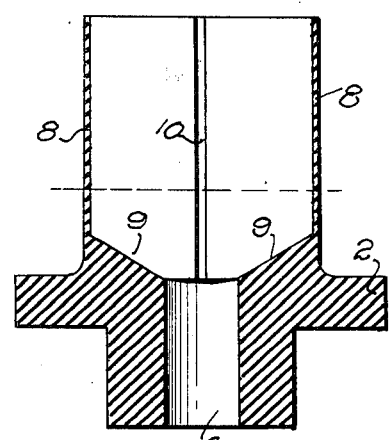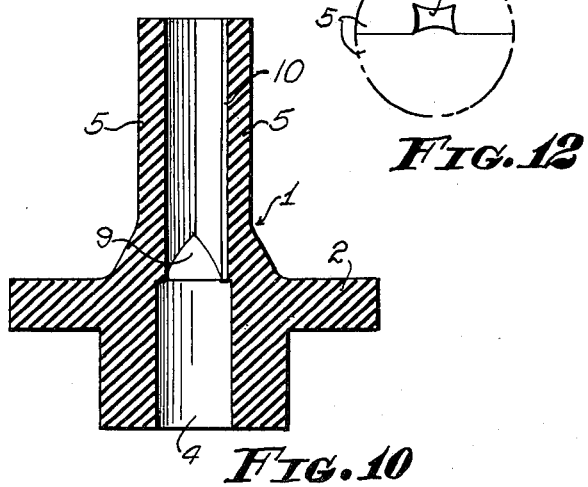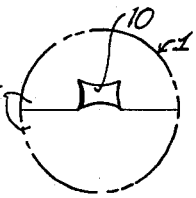

FLUSH-DRIP IRRIGATION EMITTER

BACKGROUND

The present invention is related to a copending Reissue application Ser. No. 534,745, now Pat. No. RE29022, application Serial No. 529,712 now abandoned and to U.S. Pat. No. 3,693,888. In the development of flush-drip irrigation emitters, difficulty has been experienced in insuring that the emitters can be depended upon to shift from flush to drip mode. This problem exists principally in agricultural use because it is desirable to have the maximum number of drip outlets in a flow line of minimum size and to maintain a minimum pump capacity; whereas, to insure successful flush to drip conversion, increased pump capacity has been required or the use of flat hose such as disclosed in U.S. Pat. No. 3,779,468, has been needed. To date, the extra cost has been a detering factor.

SUMMARY

The present invention is directed to a flush-drip irrigation emitter which is summarized in the following objects:

First, to provide a flush-drip irrigation emitter which includes an emitter element so arranged that conversion from flush mode to drip mode occurs at extremely low line pressure, in the order of 1 pound per square inch or less, while maintaining an adequate flushing area; that is, each emitter element discharging from a common flow line is so arranged that the water needed for flush flow mode from each emitter element is minimal due to low pressure conversion.

Second, to provide a flush-drip irrigation emitter which includes novelly arranged housing components which snap lock by application of axial force and simultaneously sealingly engage the periphery of an emitter element.

Third, to provide emitter housing components as indicated in the preceding object, which, when secured, maintain their locked condition even under excessive pressure; the housing components defining an annular groove for insertion of a prying tool to effect separation, if required; the housing components also being arranged to be permanently joined, without change, by heat sealing or cementing procedure.

Fourth, to provide a flush-drip irrigation emitter, wherein an embodiment thereof is arranged to contain dual emitter elements disposed for flow in opposite directions at different drip flow rates, such as one gallon (3.78 liters) per hour in one direction or two gallons (7.56 liters) per hour in the opposite direction, the housing components being so arranged that merely reversing the connection to a supply line, flow in either direction may be obtained.

Fifth, to provide a flush-drip irrigation emitter which incorporates a novelly arranged insect guard which may be connected directly to a housing component or indirectly through a small discharge tube.

DESCRIPTION OF THE FIGURES

FIG. 1 is a side view of one embodiment of the flush-drip irrigation emitter.

FIG. 2 is another side view thereof to which a distributor tube has been added.

FIG. 3 is an enlarged sectional view thereof taken through 3—3 of FIG. 1.

FIG. 4 is an enlarged end view of the insect guard.

FIG. 5 is an enlarged sectional view corresponding to FIG. 3 showing another embodiment of the flush-drip irrigation emitter.

FIG. 6 is an end view of an insect guard for the embodiment shown in FIG. 5.

FIG. 7 is an enlarged sectional view corresponding to FIG. 3 showing a further embodiment of the flush-drip irrigation emitter.

FIG. 8 is an enlarged end view of the emitter element employed in the flush-drip irrigation emitter shown in its flush flow mode.

FIGS. 9 and 10 are enlarged sectional views thereof taken through 9—9 and 10—10 of FIG. 8.

FIG. 11 is a further enlarged view of the entrance end of the emitter element in its drip flow mode.

FIG. 12 is a fragmentary, still further enlarged view of the entrance end of the emitter element showing the drip duct under pressure.

DETAILED DESCRIPTION

Referring to FIGS. 8 through 12, here illustrated is an emitter element designated 1. The emitter element includes a base flange 2 and a cylindrical outlet extension 3 having an outlet bore 4. Extending from the base flange in the opposite direction from the extension 3 is a pair of confronting walls 5 arched equally in opposite directions to form a flush flow passage 6 which is essentially lens shaped in cross section and forming sharp lateral edges 7 meeting in a sharp acute angle. At these edges the walls are joined by thin webs 8. The flush flow passage is of uniform cross section except at the end joined to the flange 2, there the flush flow passage 6 merges into the bore 4 by converging wall surfaces 9.

One of the walls is provided with a centrally located longitudinal drip duct 10 of uniform cross section and communicating with the bore 4. Centered with respect to the drip duct, each wall is provided a small arched rib 11.

Referring to FIGS. 1 through 4, the embodiment of the flush-drip emitter here shown includes two complementary housing components 12 and 13. The housing component 12 includes a cylindrical wall 14 having an internal latching flange 15 and is joined to a flat base wall 16 provided with an extension sleeve 17 having a bore 18. The bore is provided adjacent its extremity with an internal retainer flange 19, and its end joining the base wall 16 is provided with a counterbore 20.

The other housing component 13 includes a cylindrical wall 21 having an annular external latching flange 22 engageable with the internal latching flange 15 and is joined to a base wall 23 having a laterally offset inlet tube 24 provided externally with an annular retainer rib 25. The dimensions of the latching flanges are such that, when forced past each other, the housing components remain attached within a normal working range of pressure plus a safety range. The housing component 13 is provided with an external flange 26 confronting the housing component 12 forming an annular channel 27 dimensioned to receive a screw driver or other prying tool to separate the housing components. If separation is not required, the abutting surfaces of the latching flange may be heat sealed or an adhesive may be used. Also the flange 26 may be omitted.

The emitter is assembled by placing the base flange 2 of the emitter element 1 against the base wall 16 and the outlet extension 3 in the counter bore 20. The wall 21 of the housing component 13 is then forcibly telescoped into the cylindrical wall 14 of the housing component 12 until the latching flanges interlock. As this is accomplished, the extremity of the wall 21 presses into the flange 2 of the emitter element forming a seal between the flange 2 and both housing components. For this purpose, the extremity of the wall 21 may be beveled.

The extension sleeve 17 receives an insect barrier cap 28 having internal ribs 29 which are frictionally received on the sleeve 17 forming therewith a ring of passages 30. If it is desired to discharge the water at a distance from the emitter housing, a distributor tube 31, as indicated in FIG. 2, may be used. Such tube may be thrust into the bore of the extension sleeve 17 for retension by the internal flange 19. The extremity of the barrier cap 28 is provided with a reduced bore having internal ribs 32 continuing from the ribs 29 which are frictionally received over the distributor tube 31 and form therewith a ring of passages 33. The area of either passage 30 or 33 is substantially less than the bore 4 of the emitter element, but the cumulative area is greater so that the cap 28, whether used on the extension sleeve or distributor tube 31, does not restrict flow through the emitter tube.

Referring to FIG. 7, if two outlets from a single location are desired, a pair of housing components 12 may be joined to a tubular housing component 34 provided with a pair of external latching flanges 22. In this embodiment, a pair of emitter elements 1 are disposed in axially spaced relation and the housing component 34 is provided with a radial inlet tube 24.

Referring to FIGS. 5 and 6, if two rates of flow are desired without disassembling the emitter housing, a tubular housing component 35 having a pair of internal latching flanges 15 may be interposed between a pair of housing components 13. In this embodiment a pair of emitter elements 1 may be molded with a common base flange 36 or separate emitter elements with their respective base flanges in mutual contact may be used, providing that the outlet extensions 3 are removed. With this arrangement either offset tube 24 may function as an inlet tube or an outlet tube.

Only the emitter element received within the tube 24 which forms the inlet, actually functions as an emitter, for reverse flow through the outer emitter element will not cause collapse to drip flow. By way of example, one emitter element may have a single drip duct dimensioned for flow of one gallon (3.78 liters) per hour. The other may have a pair of drip ducts, or one larger duct, for flow at two gallons (7.56 liters) per hour. By reversing the position of the housing, either emitter element may be used.

The tube 24 functioning as the outlet may receive an insect barrier cap 36 having internal ribs and channels in the manner of the cap 28.

Referring again to FIGS. 8 through 12, in order to provide adequate flushing during a minimum time interval, it appears from tests of sample emitter elements, that successful flush-to-drip flow is attainable by an emitter element having approximately the following specifications:

| | |
|---|---|
| Major width of flush passage 6 between: | .250 – .350 in. (6.35 – 8.39 mm) |
| Minor width of flush passage between: | .050 – .100 in. (.127 – .254 mm) |
| Effective length of flush passage between: | .200 – .375 in. (5.08 – 9.75 mm) |
| Emitter outlet diameter: | .075 – .125 in. (1.90 – 3.06 mm) |
| Wall thickness in the order of: | .025 in. (.064 mm) |
| Webs 8 in the order of: | .010 in. (.025 mm) |

The arched ribs 11 of the walls 5 add about 50% to the central wall thickness but apparently do not affect the pressure at which drip flow occurs.

To produce approximately one gallon per hour (1.4 liters) the drip channel is in the order of 0.010 × 0.015 inches (0.0025 × 0.0037 mm). If two gallons per hour (2.8 liters) is desired, two channels may be used, or a single channel of appropriate dimension may be used. If a flow rate of a fraction of a gallon is desired, the dimensions of the drip channel are correspondingly reduced.

Tests over a range of pressure between 3 pounds (1.36 kg) to 50 pounds (22.68 kg) have indicated that a variation in flow rate in the order of 5% to 10% may be attained by selection of the shore value and the wall dimensions in the vicinity of the drip channel or channels.

The dimensions of the test emitter elements were within the range indicated and the test emitter elements were formed of an elastomer having a shore value of approximately forty. A lesser shore value reduces the pressure at which drip flow occurs.

A set of one hundred test emitter elements were placed in housings functionally similar to the housing shown in FIGS. 1 and 3 including the insect guard. The housings were then attached at one foot (0.305 cm) intervals to a sloping plastic hose of approximately 1 to 10 ratio and having an inside diameter of approximately ⅜ inch (0.200 mm). When water was applied to the lower end of the line the first four to six emitters were in flush mode. As the water progressed through the hose, the number in flush mode remained substantly constant and converted from flush to drip mode in succession. All emitter elements converted to drip mode with the pressure at the inlet end limited to approximately 7 lbs. per square in. (0.49 kg/cm$^2$).

When the top emitter is converted to drip mode the pressure at the upper end of the line was approximately 3 lbs. per square in. (0.211 kg/cm$^2$).

When water was supplied at the upper end of the line, a larger number of emitters were in flush mode, however all emitters converted to drip mode with a final pressure at the upper end of the line in the order of three pounds.

In another test one hundred emitters were mounted one inch (25.4 mm) apart in a vertical ⅜ in. (15.9 mm) test line approximately nine feet (2.74 m) high allowing for end fittings. The water pressure was slowly increased from zero pressure raising the level of water in the test line. When the water level reached between 18 and 24 in. (45.72 and 60.96 cm) as indicated by the height of the top emitter in flush mode, the lowermost emitter converted to drip mode, indicating that the pressure at which drip mode occurs is equal to the height of the water column. Continued increase in inlet pressure caused suceeding emitters to convert to drip mode while the number at flush mode remained substantly constant.

The following factors appear to contribute the low pressure, short interval conversion to drip mode:

A. The thin webs 8 which offer virtually no resistance to mutual collapse of the arched walls. In fact, the extended portions of the webs may be slitted providing the slits do not extend into the region significantly below the plane of the broken line 37 in FIG. 9, where the base extremities of the walls are held apart by the wall surfaces 9 and, if severed, would add to the volume of drip flow. It is preferred to mold the emitter with the thin webs for, to form slits would introduce a molding problem. While handling the emitter element prior to installation may cause some tearing or slitting, once installed, the emitter elements are protected and the webs are not subject to shearing forces.

B. Minimal stress occurs in the walls 5 as they may be quite thin and of low shore. Also because both walls are equally arched they move a minimum distance in moving to their mutually engaging flat condition. It is due to the fact of the thin wall dimension that the central ribs 11 are needed. The ribs 11 serve to control the constriction of the drip duct to compensate for increased pressure in drip mode in order to provide nearly constant flow over a wide range of pressure; that is, from two or three pounds to fifty pounds of pressure per square inch or more.

C. The large area provided by the flush flow passage 6 causes the flush flow passage to convert to drip flow in response to minimal pressure differentials.

D. The adequate outlet bore 4 minimizes any back pressure in the flush flow passage which would raise the pressure at which drip flow occurs.

Having fully described our invention it is to be understood that we are not to be limited to the details herein set forth, but that our invention is of the full scope of the appended claims.

We claim:

1. A flush-drip irrigation emitter element, comprising:
   a. a mounting base having an outlet bore;
   b. opposed, normally arched walls defining a flush passage therebetween essentially lens shaped in cross section and discharging into the mounting outlet bore the walls having lateral edges separated by slits;
   c. one of the walls having at least one longitudinally extending drip channel disposed between the lateral edges of the flush passage;
   d. the walls being formed of highly flexible elastomeric material and, when subject to a predetermined low pressure differential during initial flush flow, are caused to move into essentially flat mutual sealing contact throughout an area extending to the lateral edges and extending a predetermined distance axially, thereby to limit flow solely to the area of the drip channel, the lateral slits offering no resistance to closure of the walls into mutual sealing contact to minimize the pressure required to effect drip flow.

2. A flush-drip irrigation emitter, comprising:
   a. a housing including telescoping housing components forming a chanber having an inlet and an outlet, one of the housing components having a tubular extension;
   b. latch elements carried by the housing components for mutual engagement upon telescoping movement of the housing components to restrain the components against separation;
   c. a flush-drip emitter element including a flanged mounting base dimensioned to be clamped between the housing components to form a seal therebetween upon mutual engagement of the latch elements, the mounting base forming an outlet bore;
   d. the emitter element further including walls defining a flush passage extending inwardly from the outlet bore;
   e. one of the walls having at least one longitudinally extending drip channel;
   f. the walls being formed of a highly flexible elastomeric material and, when subject to a predetermined low pressure differential during initial flush flow, are caused to move into mutual contact except for said drip flow channel;
   g. a tubular extension projecting from the housing chamber outlet;
   h. and a cap received by the tubular extension, the cap having a ring of internal ribs including radial portions overlying the extremity of the tubular element, and axial portions frictionally received on the tubular element, the ribs forming a ring of discharge passages directed toward the housing, the discharge passages having an accumulative area greater than the emitter element outlet to avoid obstruction of flow through the emitter element, the area of each discharge passage, being such as to screen most insects from the entrance to the emitter element.

3. A flush-drip irrigation emitter comprising:
   a. a housing including telescoping housing components forming a chamber having an inlet and an outlet, one of the housing components having a tubular extension;
   b. latch elements carried by the housing components for mutual engagement upon telescoping movement of the housing components to restrain the components against separation;
   c. a flush-drip emitter element including a flanged mounting base dimensioned to be clamped between the housing components to form a seal therebetween upon mutual engagement of the latch elements, the mounting base forming an outlet bore;
   d. the emitter element further including walls defining a flush passage extending inwardly from the outlet bore;
   e. one of the walls having at least one longitudinally extending drip channel;
   f. the walls being formed of a highly flexible elastomeric material and, when subject to a predetermined low pressure differential during initial flush flow, are caused to move into mutual contact except for said drip flow channel;
   g. a tubular extension projecting from the housing chamber outlet and including an internal retainer flange;
   h. a distributor tube comparable in area to the emitter element outlet dimensioned to be frictionally received within the retainer ring;
   i. and a cap received at the extremity of the distributor tube, the cap having a ring of internal ribs including radial portions overlying the extremity of the distributor tube and axial portions frictionally receiving the distributor tube, the ribs forming a ring of discharge passages directed longitudinally of the distributor tube and having an accumulative area greater than the distributor tube to avoid obstruction to flow through the distributor tube and emitter element, the area of each discharge passage being such as to screen most insects from the entrance to the distributor tube and the emitter element.

* * * * *